United States Patent [19]

Adler et al.

[11] 4,027,921

[45] June 7, 1977

[54] PRESSURE PROBE UNLOADING DEVICE FOR PNEUMATIC OPERATED DISCHARGE GATES

[75] Inventors: Franklin P. Adler; John D. Pavolka, both of Michigan City, Ind.

[73] Assignee: Pullman Incorporated, Chicago, Ill.

[22] Filed: July 15, 1976

[21] Appl. No.: 705,723

[52] U.S. Cl. .................................. 302/52; 302/25
[51] Int. Cl.² ................. B65G 53/14; B65G 53/40
[58] Field of Search ............... 302/25, 51, 52, 57, 302/58; 214/83.28

[56] References Cited

UNITED STATES PATENTS

| | | | |
|---|---|---|---|
| 957,126 | 5/1910 | Tilley et al. | 302/52 |
| 1,346,310 | 7/1920 | Fehrle | 302/52 |
| 2,518,514 | 8/1950 | Anderson | 302/51 |
| 3,136,584 | 6/1964 | Whitlock | 302/52 |
| 3,207,560 | 9/1965 | Brown | 302/52 |
| 3,632,174 | 1/1972 | Miller | 302/52 |
| 3,675,975 | 7/1972 | Mundinger et al. | 302/52 |
| 3,693,839 | 9/1972 | Shaver et al. | 302/52 |
| 3,693,846 | 9/1972 | Schuller | 302/52 |
| 3,724,909 | 4/1973 | Adler | 302/52 |

*Primary Examiner*—Evon C. Blunk
*Assistant Examiner*—Jeffrey V. Nase
*Attorney, Agent, or Firm*—Richard J. Myers

[57] ABSTRACT

A vacuum operated discharge gate for unloading a hopper includes a tubular discharge member which has opposite ends adapted to be attached to a suction system for discharging a hopper. A probe adapted to be positioned in the tubular discharge member adapts the vacuum system to be connnected to a positive pressure source, the probe including openings and baffles associated therewith which provides a restriction within the probe thereby providing a negative pressure differential in an area adjacent the openings.

10 Claims, 8 Drawing Figures

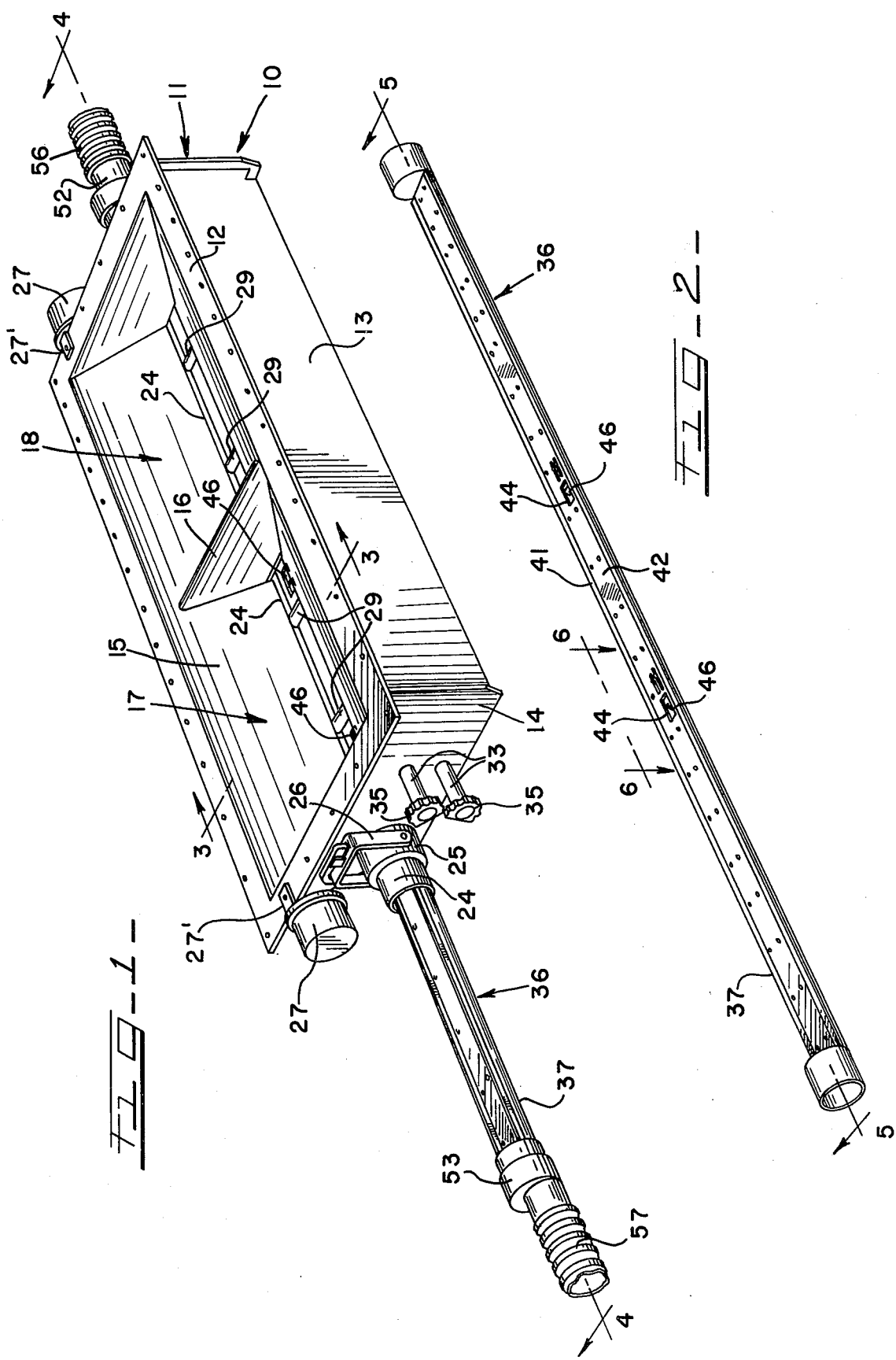

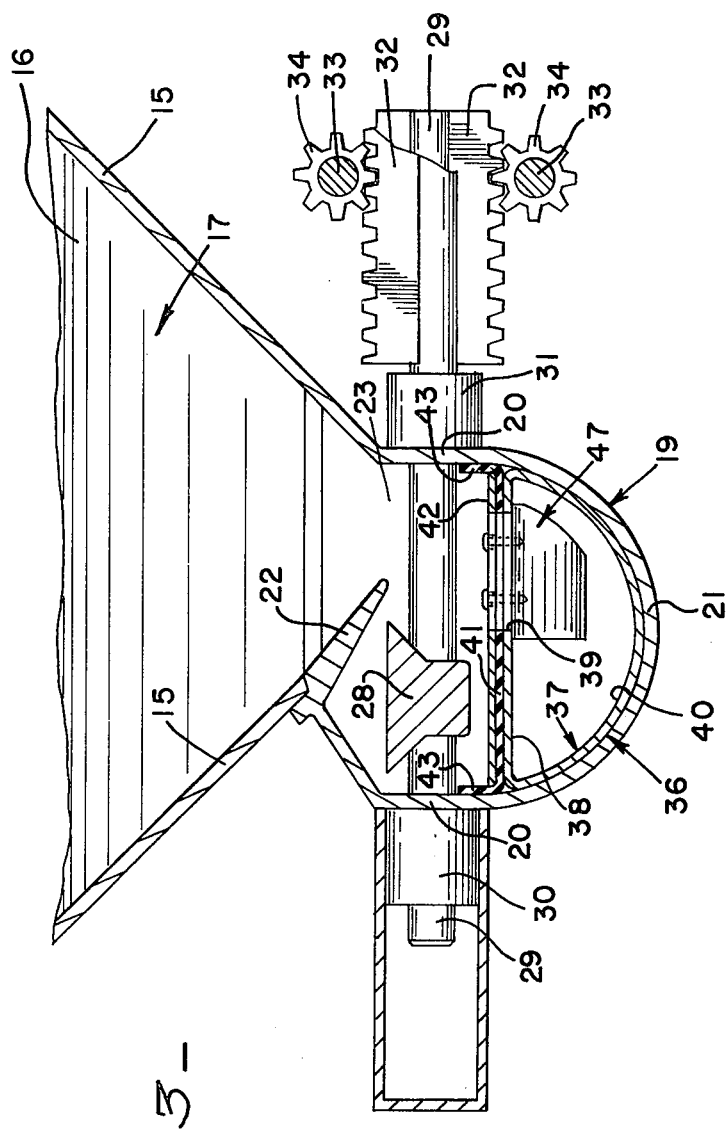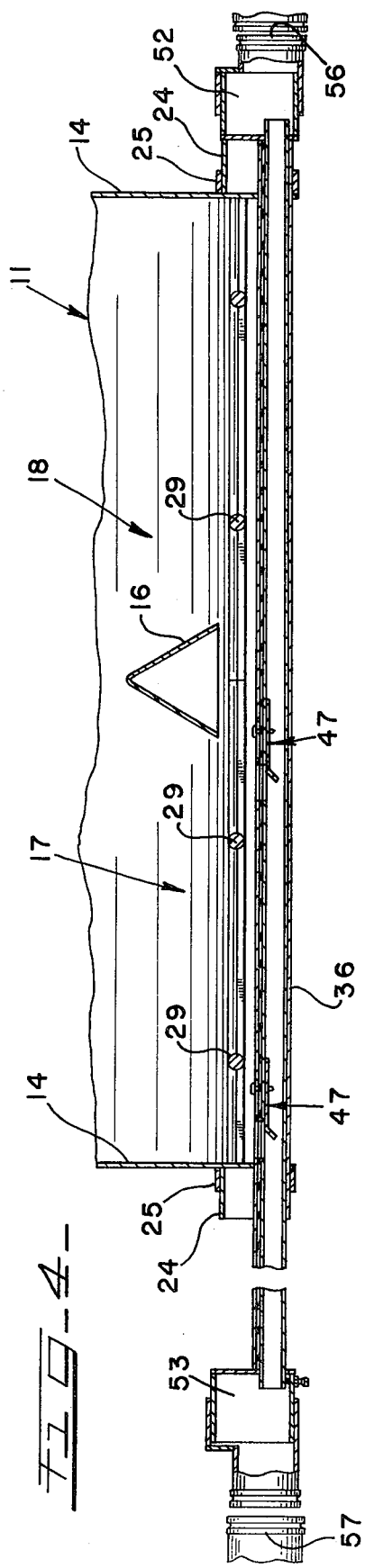

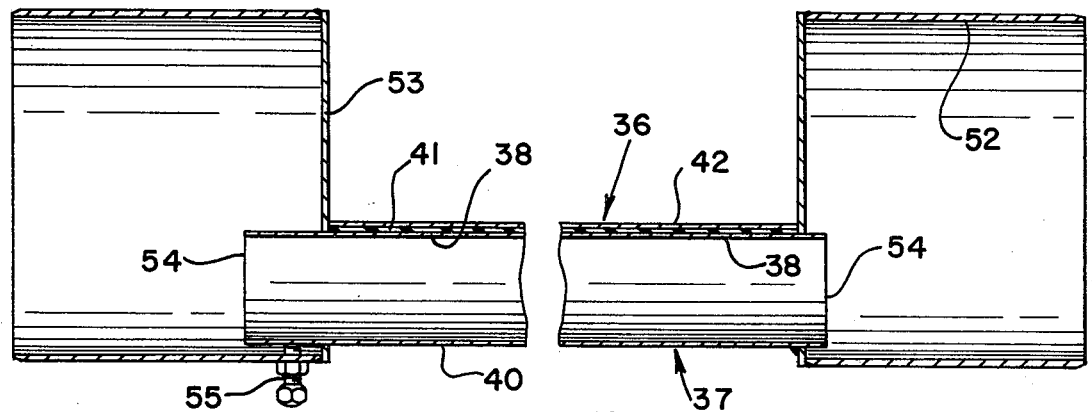
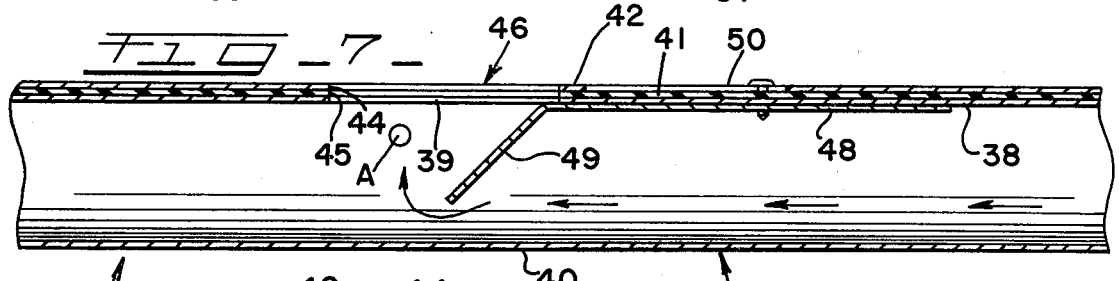
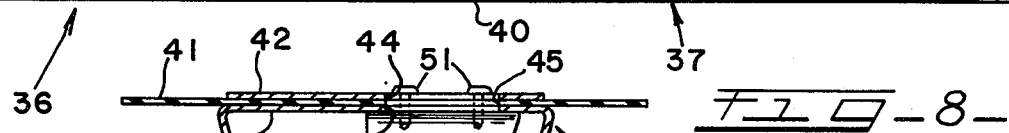
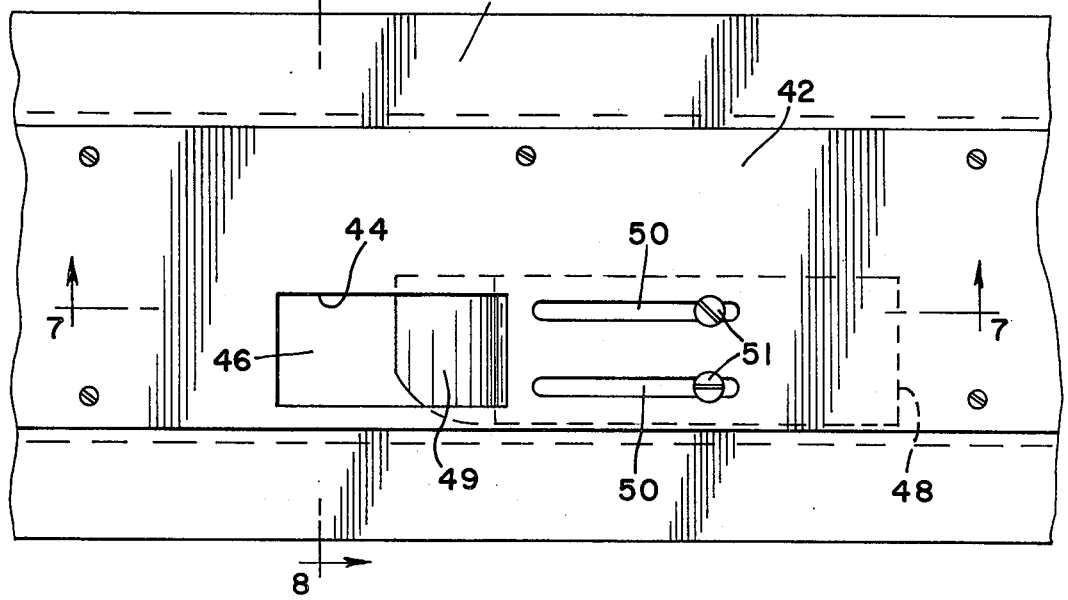

PRESSURE PROBE UNLOADING DEVICE FOR PNEUMATIC OPERATED DISCHARGE GATES

BACKGROUND OF THE INVENTION

1. Field of the Invention

The Field of Art to which this invention pertains is in Hopper Discharge arrangements of the pneumatic type and particularly to those which are associated with Railway Hopper Cars. The discharge arrangements to which the present invention particularly pertains is disclosed in U.S. Pat. Nos. 3,637,262 Jan. 25, 1972; 3,693,839 Sept. 26, 1972; 3,693,846 Sept. 26, 1972 and 3,700,143 Oct. 24, 1972.

2. Description of the Prior Art

The prior art is disclosed in U.S. Pat. Nos. 2,732,107 Jan. 24, 1956; 2,950,144 Aug. 23, 1960; 2,979,235 Apr. 11, 1961; 3,020,093 Feb. 6, 1962; 3,034,263 May 15, 1962; 3,050,342 Aug. 21, 1962; 3,663,066 May 16, 1972; 3,677,590 July 18, 1972 and 3,675,975 July 11, 1972.

SUMMARY OF THE INVENTION

The present invention concerns a pressure probe adaptable to a hopper discharge gate which normally is connected to a vacuum or negative pressure system which by means of suction discharges the hopper of a railway hopper car. A pressure probe is adapted to be inserted into the tubular discharge conduit or housing portion of the vacuum gate and projects outwardly from opposite ends thereof. One end of the probe is attached to a pressure conveying system for transporting the material from the hopper car to its ultimate destination. The other end of the probe is connected to a pressure system which provides the air pressure for discharging the hopper car. The probes includes openings which communicate with the discharge opening of the vacuum operated discharge gate. A baffle or air foil member is positioned within the probe immediately adjacent each of the discharge openings and thereby creates a pressure restriction within the probe which results in a negative pressure differential at the area of the openings. This negative pressure area functions to permit the vacuum operated discharge gate to be operated in a similar manner as in the conventional vacuum gate operation. The pressure probe thereby functions to adapt the vacuum type gate for pressure operation.

BRIEF DESCRIPTION OF THE DRAWINGS

FIG. 1 is a perspective view of a vacuum operated discharge gate for hoppers including a pressure probe improvement;

FIG. 2 is a perspective view of a pressure probe;

FIG. 3 is a cross-sectional view taken along the line 3—3 of FIG. 1;

FIG. 4 is cross-sectional view taken substantially along the line 4—4 of FIG. 1;

FIG. 5 is an enlarged cross-sectional view taken along the line 5—5 of FIG. 2;

FIG. 6 is a partial plan view taken along the line 6—6 of FIG. 2;

FIG. 7 is a cross-sectional view taken along the line 7—7 of FIG. 6; and

FIG. 8 is a cross-sectional view taken along the line 8—8 of FIG. 6.

DESCRIPTION OF THE PREFERRED EMBODIMENT

The aforementioned patents which describe the Field of Invention all apply to vacuum discharge gates for discharging materials from the hopper of a hopper car when connected to a suitable vacuum system. These gates all include a housing which is attached to a lower end of a hopper and includes a receiving chamber divided into two sections by means of a central divider. A discharge opening within the housing discharges material into an elongated tube capped at one end and has its other end connected to the vacuum system which also conveys the material to its point of destination. The discharge opening is controlled by two valves, each of which may be operated by the operator standing on one side of the housing or the other. During the vacuum connection the operator opens up the hatch cover covering the hopper which is being unloaded and material is moved to the discharge tube to the vacuum conveying equipment.

Referring now particularly to FIG. 1 a hopper discharge gate arrangement 10 comprises a housing 11 having at its upper end an attaching flange 12. The housing 11 also includes side walls 13 and end walls 14 which are suitably connected to sloping inner walls 15 which support a divider wall 16 dividing the housing 11 into laterally spaced adjacent housing sections 17 and 18.

As best shown in FIGS. 1 and 3, a first tube or tubular housing portion 19 is connected to the lower end of the sloping walls 15 and includes a pair of horizontally spaced vertical walls 20 which are integral with a semi-cylindrical wall 21 at the lower end thereof. One of the sloping inner walls 15 includes a wall extension 22 which with the other wall 15 forms an elongated discharge opening 23 extending the length of the housing 11. The first tube 19 includes tubular end portions 24 extending outwardly on opposite ends of the housing 11, the same having connected thereto tubular collars 25 which pivotally support bale members 26 adapted to engage and lock end caps 27 in a closed position. The caps 27 are removable and in the non-use position are supported on the housing 11 by means of brackets 27'.

Each of the sections include a valve member 28, best shown in FIG. 3. The valve member 28 of each section includes transverse slide bars 29 which on one side of the first tube 19 are each supported on a bearing 30 and on the other side of the tube 19 are each supported on a bearing 31. The spaced valve members 28 are actuated by means of racks 32 connected to the slide rods 29. Shafts 33 extending longitudinally within the housing 11 are supported on the end walls 14 and include pinions 34 which engage the racks 32 for moving said members 28 laterally between open and closed positions relative to the elongated discharge openings 23. The shafts 33 which project outwardly on opposite ends of the housing 11 have connected thereto hand operated members 35 which permit actuation of the valve members 28 from opposite sides of the housing 11.

Referring now particularly to FIGS. 2, 5, and 7 a pressure probe 36 comprises a second tube 37 including a flat upper wall 38 which is apertured lengthwise to provide a slot 39. The flat upper wall 38 is integral with an arcuate or semi-cylindrical wall 40 and a flexible rubber-like top cover member 41 is supported between the wall 38 and upper plate 42. As best shown in FIG.

3, when the probe 36 is inserted within the first tube 19 the outwardly extending flanges 43 of the rubberlike cover 41 are turned upwardly against the walls 20 of the first tube. As best shown in FIG. 8, the upper plate 42 is apertured as indicated at 44 and the cover 41 is apertured as indicated at 45 to provide an opening means 46 at longitudinally spaced point of the probe as shown in FIGS. 2, 7, and 8. Adjacent to the openings 46, as best shown in FIGS. 5 and 8 there are provided baffles or air foil means 47 including a longitudinally slidable plate 48 having at one end thereof a baffle or air foil element 49 which projects diagonally downwardly into the second tube 37. The top plate 42 as best shown in FIGS. 6 and 7 adjacent each of the openings 46 is provided with a pair of longitudinally extending slots 50 through which extend screws 51 screwed into the plate 48 of the baffle or air foil means 47. The baffle means 47 is thus adjustable longitudinally to mask or cover portions of the opening 46 as desired.

The tube 37, as best shown in FIG. 5 is provided at one end with a tubular hose connector 52 to which may be connected a rubber hose 56 which is in turn connected to a source of high air pressure (not shown). One tube end 54 is suitably secured within the tubular hose connector 52 and the other tubular end 54 of the tube 37 is secured within the tubular hose connector 53 and is removably fastened thereto by means of a connector screw 55. The tubular hose connector 53 may be connected to a hose 57 forming part of a pressure system for conveying materials to a suitable storage bin. Whenever the gate 10 is utilized for vacuum operation one of the caps 27 is removed from the tubular connection 24 and a suitable source of negative pressure is attached thereto. The hopper being unloaded has its hatch cover opened and upon the application of vacuum material such as pellets, etc. are discharged from the hopper to a suitable storage means. However, when the gate 10 is utilized for positive pressure operation both of the caps 27 are removed and the hose 56 is connected to the high pressure source. The tubular probe has been inserted into the gate as shown in FIGS. 1, 3, and 4 and a hose 57 has been connected to the tubular hose connector 53. As shown in FIG. 3 the pressure probe and second tube 37 is in position with the lower wall 40 conforming to the shape of the arcuate wall 21 so that it is firmly seated therein. The flexible flange portions 43 of the top cover member 41 are extending vertically in conformity to the vertical walls 20 of the first tubular member 19. Initially the openings 46 of the probe are positioned within the lefthand section 17 of the gate as shown in FIG. 1 and the valve associated with the first section is initially opened by actuating one of the hand operated members 35. This is achieved by turning one of the shaft 33 thus actuating one of the racks 32 to cause opening movement of one of the valves 28 as shown in FIG. 3. When the hopper has been unloaded and another hopper is to be unloaded on the other side of the railway car the probe is moved through the first tubular member so that the openings 46 are now within the section 18 so that the openings now discharge material from the second hopper to be unloaded in a similar manner.

Positive air pressure during the operation enters into the tubular hose connector 52 and as best shown in FIG. 7 the high pressure moves in the direction of the arrows to the left. The high pressure is restricted by means of the baffle or air foil 49 which extends inwardly into the probe. The restriction provided by the baffle causes a partial vacuum to exist in the circled area designated by the letter A as shown in FIG. 7, this area of partial vacuum providing for the reception and discharge of material through the openings and subsequent discharge through the connector 53 and hose connection 57. Thus since the air foils or baffles 49 are provided immediately below each opening 46 a negative pressure differential is created between the inside of the hopper and the probe which causes the bulk of material to flow into the probe. As indicated previously the hopper hatch cover as in the case of vacuum application also has been opened. Because the baffle maintains a negative pressure differential the use of a positive pressure source will discharge the interior of the hopper and yet not increase the positive pressure within the car which normally could lead to rupture of the car walls or seals.

During conventional pressure discharge of hoppers one wall of the hopper car is connected to the pressure source and the other is opened to a hose connection for discharging material by means of pressure. In the present arrangement the vacuum gate is effective for use with a pressure system and by means of the novel arrangement of the air foil restriction within the probe, air pressure can be utilized for creating the pressure differential which in turn unloads the interior of the hopper by utilization of the vacuum.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A hopper discharge arrangement including a housing adapted to be connected for communication with the discharge opening of a hopper,
    said housing including downwardly and inwardly sloping sides, terminating in an elongated discharge opening,
    an elongated first tube open at its ends rigidly connected to said housing below said elongated opening and communicating therewith,
    valve means regulating the flow of material through said elongated opening, and
    removable closure caps for the open ends of said first tube, the improvement comprising;
    a second pressure discharge tube insertable through one of the open ends of said first tube and projecting outwardly from opposite ends thereof,
    said second pressure discharge tube having opening means adapted to communicate with said elongated discharge opening,
    and means within said second pressure discharge tube adjacent to said opening means restricting the air pressure flow through said second tube thereby providing a negative pressure differential in the area of said opening means whereby material flows through said opening means and is discharged through one end of said second tube, said other end of said second discharge tube being connected to a source of positive pressure.

2. The invention in accordance with claim 1, said restricting means comprising an air foil projecting into said second pressure discharge tube.

3. The invention in accordance with claim 1, said restricting means comprising a baffle extending inwardly into said second pressure tube.

4. The invention in accordance with claim 3, said baffle being adjustably supported on said second pressure tube for varying the size of said opening means.

5. The invention in accordance with claim 4, said baffle including a plate portion slideably connected to the wall of said second pressure tube, and an airfoil element connected to said plate portion and extending transversely within said second pressure tube.

6. The invention in accordance with claim 1, said housing including longitudinally spaced adjacent sections separated by a divider wall,
   said valve means including a valve for each of said sections individually operable from a side of said housing for discharging material through elongated opening,
   said second pressure tube having a length sufficient to permit movement of said pressure tube through said first tube to positions wherein said opening means may be successively placed into discharge communication with said elongated opening means in each of said sections.

7. The invention in accordance with claim 6, said second tube including a tubular connector element at one end adapted to connect the same to a source of positive pressure, and
   a second disconnectable tubular connector element at the other end of said second tube adapted to be connected the same to pneumatic conveying means, said second connector elements being removable from said second tube during interconnection of said first and second tubes.

8. The invention in accordance with claim 1, said second tube comprising an elongated flat upper wall portion connected to a semi-cylindrical lower wall portion coextensive therewith,
   said lower wall portion conforming to the inner lower wall surface of said first tube.

9. The invention in accordance with claim 8, said opening means comprising a plurality of longitudinally spaced openings in said upper wall portion, and
   said restricting means including plurality of baffles, each being positioned adjacent one of said openings and projecting into said second tube toward said lower wall.

10. The invention in accordance with claim 9, including a flexible member connected to said flat upper wall and projecting outwardly or laterally opposite sides thereof for engaging and conforming to the inner wall portion of said first tube.

* * * * *